United States Patent [19]

Muterel

[11] 3,733,823

[45] May 22, 1973

[54] MASTER CYLINDER FOR HYDRAULIC CLUTCH CONTROL SYSTEM

[75] Inventor: Roland Muterel, Bessancourt, France

[73] Assignee: Societe Anonyme D.B.A.

[22] Filed: Dec. 16, 1971

[21] Appl. No.: 208,564

[30] Foreign Application Priority Data

Dec. 30, 1970 France..............................7047278

[52] U.S. Cl. .............................................60/54.6 R
[51] Int. Cl................................................F15b 7/00
[58] Field of Search......................60/54.6 R; 251/82

[56] References Cited

UNITED STATES PATENTS 2,649,692   8/1953   Stelzer................................60/54.6 R 3,269,409   8/1966   Ansell.................................60/54.6 R

*Primary Examiner*—Martin P. Schwadron
*Assistant Examiner*—A. M. Zupcic
*Attorney*—Leo H. McCormick, Jr. et al.

[57]     ABSTRACT

A hydraulic master cylinder more particularly adapted to control a hydraulic clutch control system. The variable volume fluid chamber of the master-cylinder communicates with the outlet port connected to an hydraulic clutch receiver through a one-way valve 42 in such a manner that the check-valve normally delayes the return fluid flow to the chamber. The valve 42 is unseated by a sliding sleeve when the inward travel of the piston exceeds a predetermined value. A ball cooperates with sleeve to maintain the latter in either of two predetermined positions corresponding to the opened and closed position of the one-way valve.

10 Claims, 1 Drawing Figure

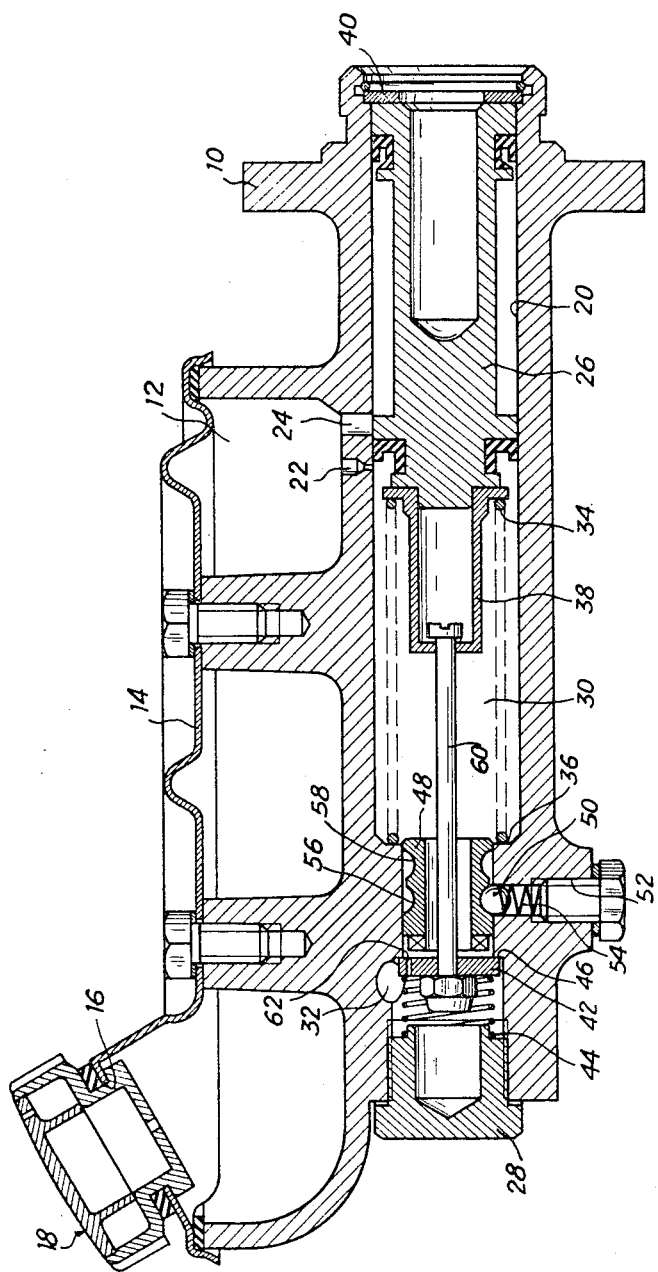

MASTER CYLINDER FOR HYDRAULIC CLUTCH CONTROL SYSTEM

The invention relates to a hydraulic master cylinder adapted to be used in a hydraulic clutch control system.

There have already been proposed hydraulic master cylinders comprising a control piston sealingly slidable in a bore housing to define therein a variable volume fluid chamber connected to an outlet port, and an operator operated input control mechanism for actuating said control piston inwardly said fluid chamber against the action of resilient means biasing said control position in its normal release position.

In particular cases of utilisation such as in hydraulic clutch control systems, it was found necessary to warrant a minimum volume of liquid flowing out from the fluid chamber with a view to obtaining a correct operation of the clutch system. In other words, it is necessary that the working stroke of the control mechanism, i.e., the pedal push-rod secured to the master cylinder control piston, must be longer than a predetermined value.

With the view of obliging the operator to conveniently depress its control pedal, the invention proposes means adapted to prevent the outward movement of the control piston toward its rest position, as long as the inward stroke is below a predetermined value.

More particularly, the invention relates to a master cylinder as hereinabove described, further comprising a one-way valve operatively arranged between said fluid chamber and said outlet port for normally preventing return fluid flow from this latter to said outlet chamber, first valve actuating means operatively connected to said control piston for actuating said one-way valve in its open position allowing said return fluid flow whenever said control piston is moved a predetermined distance inwardly said fluid chamber, positioning means adapted to maintain said one-way valve in its said open position and, second valve actuating means operatively connected to said control piston for actuating said one-way valve back to its normal closed position against the action of said positioning means whenever said control piston is biased by said resilient means in its normal release position.

The invention will now be described by way of example with reference to the accompanying drawing in which the sole FIGURE is a longitudinal cross-section of a master-cylinder according to the invention.

The master-cylinder illustrated in the FIGURE is adapted to be connected to a vehicle hydraulic control clutch system (not shown). The master cylinder housing 10 is provided with a reservoir cavity 12 closed by a cover 14, the refilling orifice 16 thereof being conveniently closed by a cap 18. The housing 10 comprises a bore 20 one end thereof being closed by a plug 28. The bore 20 communicates with a reservoir cavity 12 through the well-known compensating orifice 22 and refilling orifice 24. A control piston 26 is slidably mounted in the bore 20 to define with the plug 28 a variable volume fluid chamber 30. A spring 34 is compressed between a shoulder 36 provided on the housing 10, and a retain cup 38 abutting piston 26 to urge the latter in its rest position against a washer 40 secured to the housing 10.

The fluid chamber 30 is connected to the hydraulic clutch control system through an outlet port 32 provided in the housing 10.

A one-way valve is interposed between chamber 30 and outlet port 32 whereby normally preventing fluid to flow from outlet port 32 to chamber 30. As shown in the drawing the one-way valve comprises an annular valve member 42 urged by a light spring 44 in sealed abutment with an annular seat 46 provided on bore 20.

A sleeve 48 is slidably mounted in the portion of bore 20 located between shoulders 36 and 46 whereby permitting piston 26 through the intermediary of cup 38 to unseat valve 42 from shoulder 46. Positioning means of any type known are provided to obtain an antagonist action to the displacements of sleeve 48 on either sides of two predetermined positions. As shown in the FIGURE positioning means include a plunger 50, such as a ball, slidably mounted in a bore 52 the axis thereof being substantially perpendicular to the axis of bore 20, and a compression spring 54 urging the ball 50 in abutment with the bottom of either of the annular grooves 56 and 58 provided on the outer wall of sleeve 48.

A retractable pulling connection of a predetermined length is provided between piston 26 and valve 42 whereby normally maintaining the latter in a closed position when the piston 26 is in its rest position as shown. As illustrated in the drawing, the retractable pulling connection includes a rod 60, the ends of which projecting through the central apertures of valve 42 and retain cup 38 respectively, and being provided with expanded heads adapted to abut valve 42 and cup 38 thereby defining the maximum length of the connection. In order to preserve to the valve 42 its one-way valve object, the sliding cooperation between valve 42 and the rod 60 should be fluid-tight. However, for reason of bleeding of the hydraulic system, the said sliding cooperation may have a little clearance diagrammatically shown in the drawing by a restricted area passage 62 through the valve 42.

The hereinabove disclosed master-cylinder operates as follows:

Upon actuation by the operator of the control pedal, piston 26 is inwardly urged, expelling fluid from chamber 30 to the hydraulic fluid pressure receiver (not shown) of the clutch device.

Assuming that the maximum inward travel of the piston 26 is lower than the axial distance between cup 38 and sleeve 48, the latter stands in its rest position as illustrated in the drawing. When the operator releases its control pedal, the valve 42 stands in its closed position during the return travel of the piston, thereby notably delaying the return fluid flow from outlet port 32 to chamber 30. Thus, it takes a relatively long time to the piston to return in its rest position and the operator is warned that the inward travel of the piston was not long enough to warrant correct operation condition of the clutch device.

On the contrary, assuming that the inward travel of piston 26 is longer than the hereinabove defined axial distance, the sleeve 48 is moved to the left of the FIGURE and urges the valve 42 in its opened position. Then the ball 50 cooperates with groove 58 to maintain sleeve 48 in this leftward position. When the operator releases the control pedal, the valve 42 stands in its opened position, thus the piston 26 rapidly return to its rest position, by action of the resilient means 34, assuming there is no important restriction of the fluid flow between outlet port 32 and chamber 30.

When the piston 26 is close to its rest position, the cup 38 through the intermediary of the rod 60 urges the valve 42 and the sleeve 48 to the right of the FIGURE towards their normal rest position as shown, and the ball cooperates again with groove 58.

What is claimed is:

1. A hydraulic master cylinder, comprising a housing with a bore therein, a piston slidable in said bore to define therewith a fluid chamber, resilient means for biasing said piston in a rest position, operator operated mechanism to move said piston from said rest position for pressurizing the fluid contained in said chamber, said pressurized fluid being expelled from said master cylinder housing by an outlet port, said outlet port communicating with said chamber through a one-way valve, said one-way valve having a valve member resiliently urged against a valve seat provided on said housing thereby normally impeding return flow from said outlet to said chamber upon release of said mechanism whenever the displacement of said piston from said rest position is shorter than a predetermined value, first valve actuating means for unseating said valve member and for having said valve member in an open position when said displacement reaches a predetermined value, locking means for maintaining said valve member in said open position, and second valve actuating means for unlocking said valve member upon release of said mechanism, when, during the return stroke of said piston, said piston reaches a predetermined position close to said rest position.

2. A hydraulic master cylinder according to claim 1 wherein a passage including a restricted area orifice is provided between said fluid chamber and said outlet port to by-pass said one-way valve.

3. A hydraulic master cylinder according to claim 1 wherein said first valve actuating means includes a sliding member moved by said control piston in a working position for actuating said one-way valve in said open position, said locking means opposing displacement of said sliding member away from said working position.

4. A hydraulic master cylinder according to claim 3 wherein said locking means comprises a plunger slidably mounted in a cylindrical cavity having its axis substantially perpendicular to the direction of movement of said sliding member and spring means biasing said plunger into a recess provided in the outer sidewall of said sliding member when said sliding member stands in said working position.

5. A hydraulic master cylinder according to claim 4 wherein said bore is stepped to present a larger diameter portion receiving said piston and a smaller diameter portion receiving said sliding member, said member being a sleeve the outer sidewall thereof being provided with two annular grooves adapted to receive said plunger thereby defining for said sleeve the said working position and a nonworking position.

6. A hydraulic master cylinder according to claim 5 wherein said second valve actuating means comprises a stem extending through said sleeve, said stem having one end secured to said valve member and the other end cooperating through a unidirectional abutment with a cup secured to said piston, said cup being adapted to engage said sleeve for unseating said valve member.

7. A hydraulic master cylinder according to claim 1 wherein the said second valve actuating means is comprised of a retractable pulling connection of a predetermined length provided between said piston and said valve member.

8. A hydraulic master cylinder according to claim 7 wherein said locking means comprises a plunger slidably mounted in a cylindrical cavity having its axis substantially perpendicular to the direction of movement of said sliding member and spring means biasing said plunger into a recess provided in the outer sidewall of said sliding member when said sliding member stands in said working position.

9. A hydraulic master cylinder according to claim 8 wherein said bore is stepped to present a larger diameter portion receiving said piston and a smaller diameter portion receiving said sliding member, said member being a sleeve the outersidewall thereof being provided with two annular grooves adapted to receive said plunger thereby defining for said sleeve the said working position and a nonworking position.

10. A hydraulic master cylinder according to claim 9 wherein said second valve actuating means comprises a stem extending through said sleeve, said stem having one end secured to said valve member and the other end cooperating through a unidirectional abutment with a cup secured to said piston, said cup being adapted to engage said sleeve for unseating said valve member.

* * * * *